US012775912B2

(12) United States Patent
Cohen et al.

(10) Patent No.: US 12,775,912 B2
(45) **Date of Patent: *Oct. 27, 2026**

(54) SCANNING SYSTEM USING RING SCANNER AND TERMINAL DEVICE

(71) Applicant: RGIS INTERNATIONAL HOLDINGS, LLC, Auburn Hills, MI (US)

(72) Inventors: Asaf Cohen, Ramat Gan (IL); Sudipta Nandy, Charlotte, NC (US); Ruth Percik, Ramat Gan (IL); David Kagan, Tel Aviv (IL); Patrick Marcel Gilbert André Chossat, Chatal (FR); Mathieu Durieux, Helecine (BE); John Frazer Cundall, Sheffield (GB); Jerome Thur, Les Pinthieres (FR)

(73) Assignee: RGIS INTERNATIONAL HOLDINGS, LLC, Auburn Hills, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/830,345

(22) Filed: Sep. 10, 2024

(65) Prior Publication Data

US 2025/0299154 A1 Sep. 25, 2025

Related U.S. Application Data

(63) Continuation of application No. 18/614,453, filed on Mar. 22, 2024, now Pat. No. 12,124,993.

(51) Int. Cl.

| | |
|---|---|
| ***G06Q 10/087*** | (2023.01) |
| ***G06F 3/04817*** | (2022.01) |
| ***G06K 7/10*** | (2006.01) |

(52) U.S. Cl.
CPC ....... *G06Q 10/087* (2013.01); *G06F 3/04817* (2013.01); *G06K 7/10396* (2013.01); *G06K 7/10891* (2013.01)

(58) Field of Classification Search
CPC . G06Q 10/087; G06F 3/04817; G06F 3/0482; G06F 3/04847; G06K 7/10396; G06K 7/10891
(Continued)

(56) References Cited

U.S. PATENT DOCUMENTS

| | | |
|---|---|---|
| 6,607,134 B1 | 8/2003 | Bard |
| 2005/0127185 A1 | 6/2005 | Wilz, Sr. |

(Continued)

FOREIGN PATENT DOCUMENTS

| | | |
|---|---|---|
| CN | 110728158 A | 1/2020 |
| DE | 202020100866 U1 | 8/2020 |

(Continued)

*Primary Examiner* — Russell S Glass
(74) *Attorney, Agent, or Firm* — Sterne, Kessler, Goldstein & Fox P.L.L.C.

(57) ABSTRACT

A scanner system includes a scanner device and a terminal device. A housing of the scanner device is attached to an index finger of a user. The scanner device has a plurality of buttons located on the housing and actuated by a thumb of the user. A user can manipulate a user interface of the terminal device by actuating the plurality of buttons. A controller of the terminal device execute an operation when a single button of the plurality of buttons was pressed. A result of the operation is reflected in the user interface.

20 Claims, 14 Drawing Sheets

(58) Field of Classification Search
USPC .............................................................. 705/28
See application file for complete search history.

(56) References Cited

U.S. PATENT DOCUMENTS

| | | | | |
|---|---|---|---|---|
| 2009/0266898 | A1 * | 10/2009 | Miller .................. | G06K 7/1413 235/472.01 |
| 2014/0160537 | A1 * | 6/2014 | Tanaka ............... | H04N 1/00827 358/475 |
| 2014/0249944 | A1 * | 9/2014 | Hicks ................... | G07G 1/0081 235/383 |

FOREIGN PATENT DOCUMENTS

| | | | |
|---|---|---|---|
| KR | 20150132238 | A | 11/2015 |
| WO | WO 0033239 | A1 | 6/2000 |

* cited by examiner

SCANNING SYSTEM USING RING SCANNER AND TERMINAL DEVICE

CROSS-REFERENCE TO RELATED APPLICATIONS

This application is a continuation of U.S. application Ser. No. 18/614,453, filed on Mar. 22, 2024, which is incorporated herein by reference in its entirety.

BACKGROUND

Field

This field is generally related to scanning systems.

Related Art

Inventory management has become increasingly important in recent years. An essential part of inventory management is accurately counting the number of items in a physical inventory and a retail warehouse.

Inventory workers (users) often use scanners to count the number of items. Scanners read bar codes, two-dimensional bar codes, or other identifiers (hereafter called codes) printed on products or packages containing multiple products. Inventory control systems account for the number of items according to what the scanner reads.

Users commonly hold the scanner in their hands, but in recent years, users have also been using ring scanners attached to their fingers. Ring scanners are more comfortable to operate because optical elements that perform the scanning are close to the user's finger. The ring scanner allows the user to scan more accurately.

Users sometimes use a terminal device in conjunction with a ring scanner that is separate from the ring scanner. Users often use the terminal device to display and process information collected from the ring scanner. The processing performed by the terminal device includes displaying product information and communicating with inventory management systems.

Taking inventory can be a time-consuming process. New tools are needed to enable inventory to be counted more efficiently.

BRIEF SUMMARY

This disclosure provides a scanner system that can more accurately count items. For example, the scanner system may include a scanner device and a terminal device. The scanner device may include a housing configured to attach to an index finger of a user. The scanner device may include a plurality of buttons located on the housing and actuated by a thumb of the user. The scanner device may include a first controller configured to generate an instruction, in response to the actuation of at least one of the plurality of buttons, indicating a type of the button actuated and information specifying a length of time during which the button was pressed down. The scanner device may include a first communication interface configured to transmit the instruction to a terminal device. The terminal device may include a display configured to display a user interface. The terminal device may include a second communication interface configured to receive the instruction from the scanner device. The terminal device may be separate from the scanner device but communicatively connected to the scanner device. The terminal device may include a second controller may be configured to when the instruction indicates that a single button of the plurality of buttons was pressed for a first period of time, execute a first operation. The second controller may be configured to when the instruction indicates that a single button of the plurality of buttons was pressed was pressed for longer than the first period of time, execute a second operation and reflect a result of the second operation in the user interface.

BRIEF DESCRIPTION OF THE DRAWINGS/FIGURES

The present disclosure is described with reference to the accompanying drawings. In the drawings, reference numbers indicate identical or functionally similar elements. Additionally, the leftmost digit(s) of a reference number identifies the drawing in which the reference number first appears. In the accompanying drawings:

FIGS. 1A-F are schematic diagrams illustrating a ring scanner according to an embodiment.

Figure 1A:
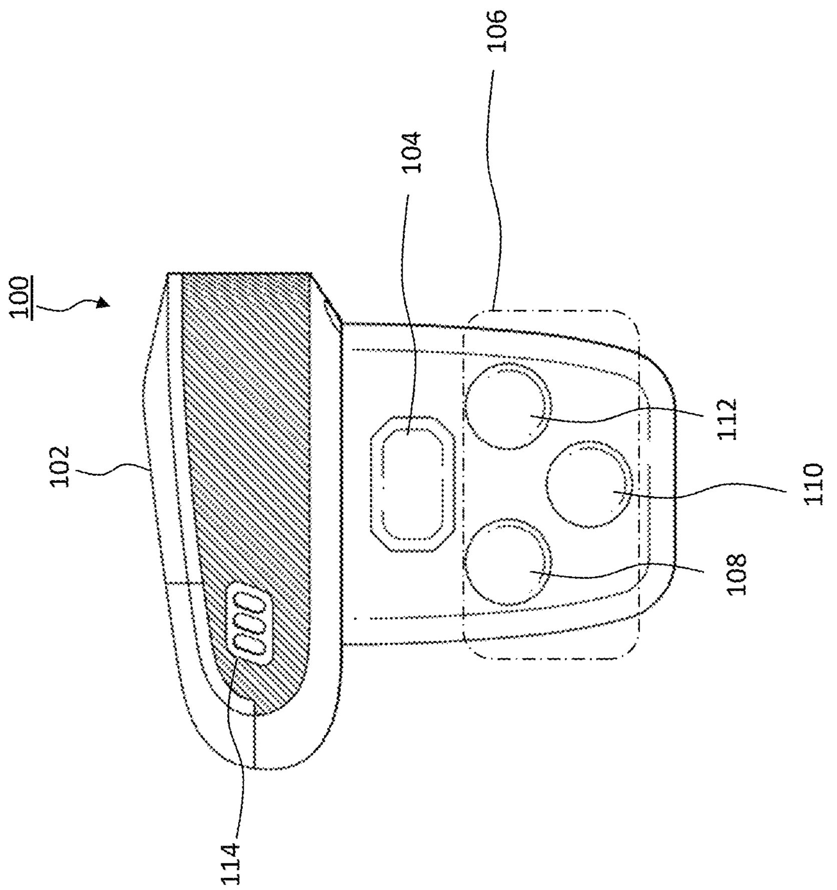

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

The following description relates to a ring scanner as an example of a scanner device. After describing the structure of the scanner device, this disclosure describes an inventory management system that includes the scanner device, followed by a description of the operation of the scanner device and the terminal device.

Structure of the Scanner Device

FIGS. 1A-F are schematic diagrams illustrating a ring scanner according to an embodiment.

FIG. 1A is a left-side view of scanner device 100. The user attaches the scanner device 100 to his or her finger. As an example, this disclosure describes a right-handed scanner device. When the user wears the scanner device 100, the user's fingertips are located on the left side of the FIG. 1A, and the user's wrist is located on the right side of FIG. 1A. The user primarily affixes the scanning device 100 to the user's right index finger. Note that this disclosure may explain that the user uses a particular finger to perform certain operations, but this is to facilitate understanding of this disclosure.

The housing 102 of the scanner device 100 holds or encloses the components described below. The housing 102 is primarily made of plastic material. The material of the housing 102 is not limited to plastic material and may be made of a variety of materials.

The scan button 104 is used to initiate scanning of the scanner device 100. The user actuates the scan button 104 primarily with the thumb.

The count buttons 106 is a button that specifies the number of items scanned by the scanner device 100. The user actuates the scan button 104 to scan the items and then actuates the count buttons 106 to specify the number of scanned items present. The user specifies the number of scanned items present by pressing the count buttons 106 after the user actuates the scan button 104. In this disclosure, the term "inventory count" may be used to refer to the number of items scanned, depending on the context.

When multiple identical products exist in a physical inventory or retail warehouse, it is time-consuming for the user to scan all the products. Therefore, the scanner device 100 of the present disclosure has a count buttons 106 that allows the user to enter the inventory count of the scanned items. For example, if a user scans one of the four items in stock, the user uses the count buttons 106 to enter four as the number of items in stock. In this way, the number of scans can be reduced, thus saving the user's time.

The scanner device 100 in the present disclosure has a count button 108, a count button 110, and a count button 112. Each count button has a different function. After the user has scanned, the user actuates count button 108 when the user enters "1" as the inventory count of the scanned item. Similarly, the user actuates the count button 110 when entering "2" as the inventory count of the scanned item. The user then actuates the count button 112 to enter "4" as the inventory count of the scanned item. The count buttons 106 are described in this disclosure as an example of a count button, the scanner device 100 may have a single count button.

The user can add up the number of inventory items entered with count buttons 106. For example, if the user scans one of the six items in inventory, the user can press a count button 110 and then press a count button 112. The order in which the count buttons are pressed is arbitrary.

The combination of count buttons 106 and the number of inventory counts described above is an example. The user may assign any number to any count buttons 106. For example, one or all of the count buttons 106 may be assigned any number from 1 to 12 as the inventory number. As another example, one or all of the count buttons 106 may be configured to be assigned one of 4, 6, or 12 as the inventory number.

As one preferred example of this disclosure, at least one count button can be a button to enter 4 as the inventory count. Having a count button to enter 4 as the inventory count is very relevant for accurate inventory counts. A human brain can recognize up to 4 numbers almost perfectly and instantly (<60 ms). However, the human brain takes longer (>350 ms) and is less accurate when counting more than 5 numbers. Therefore, at least one count button can be a button to input 4 as the inventory number. Preferably, the maximum number of inventory items that can be assigned to a count button is also 4. Preferably, the inventory count assigned to at least one count button can be 4 as a default, even if the inventory count assigned to the count button can be changed by the user.

The above description is only a preferred example. Even if 4 is not assigned as the inventory number to any of the count buttons, the scanner device 100 described in this disclosure is useful because it saves the user's time. In addition, since user's demand varies, allowing users to freely assign inventory counts to multiple count buttons improves usability. So, an implementation that assigns an inventory count of 5 or more to the count button is also one of the preferred embodiments of this disclosure.

If the scanner device 100 has three count buttons (108, 110, and 112), as discussed in the description of this disclosure, the numbers assigned to the buttons may be 1, 2, and 4, since 1 and 2 are the base numbers for counting, and 4 is the most efficient number in terms of human brain capacity, as discussed above.

If the scanner device 100 has multiple count buttons 106, as discussed in the description of this disclosure, each count button and scanner button 104 may be pressed simultaneously to execute various commands. Examples of commands include turning the flashlight on and off (to be described later) and closing an area (to be described later). In addition, when the scanner device 100 is used in connection with an application installed in the terminal device, the YES command and NO command sent to the application are also included in the examples of commands.

If the scanner device 100 has multiple count buttons 106, as discussed in the description of this disclosure, the inventory count assigned to each count button may be in ascending or descending order as it approaches the user's wrist. In this way, it is easier for the user to intuitively understand which inventory count is assigned to which count button. In a more preferred example, as discussed in the description of this disclosure, the number of inventory count assigned to each count button are in ascending order as they approach the user's wrist. The location of the count button where the user's finger naturally comes in contact with it when the user's finger is extended is the furthest away from the user. Since smaller number of inventory count (e.g., 1) are used more frequently than larger ones, it is desirable that smaller inventory count be assigned to buttons that users press in their natural state.

As one preferred example, the shape of the count buttons 106 can be different from the scan button 104. This is because the user can intuitively distinguish between two buttons with different functions.

Various configurations may be made to the count buttons 106 so that the user can intuitively distinguish between count buttons with different functions. As one preferred example, each of the count buttons 106 may have a different color. As one preferred example, each of the count buttons 106 can have a different tactile feel. As one preferred example, at least two of the respective count buttons of the count buttons 106 can be positioned at different heights (up-down direction in FIG. 1A.)

The speaker 114 plays sound in response to user actions or the state of the scanner device 100. Speaker 114 may play different sounds depending on which count button is pressed when one of the count buttons 106 is pressed. The speaker 114 may announce the number of the inventory count or total inventory count when the count button is pressed.

Figure 1B:
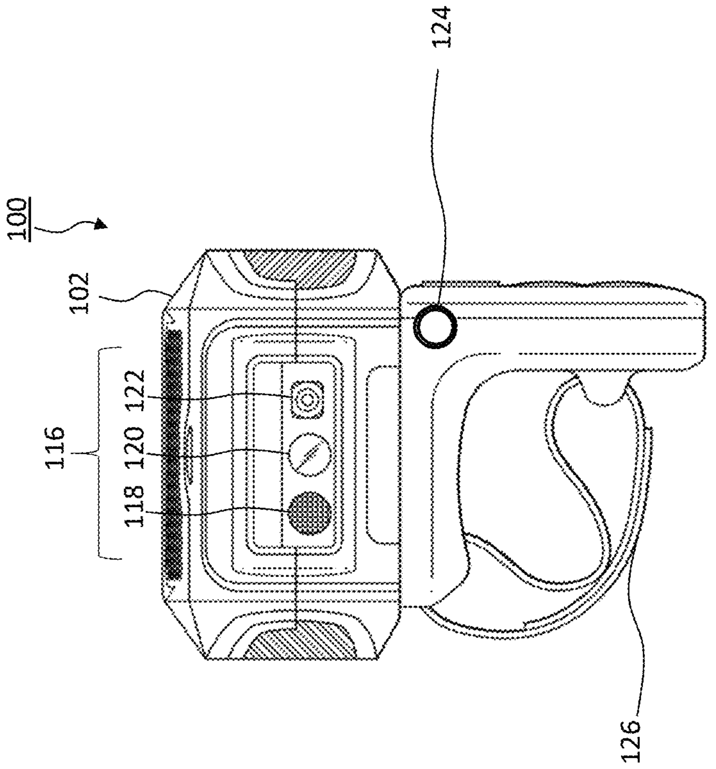

FIG. 1B is a front view of scanner device 100. The optical scanner 116 is an optical unit that scans the code of a product. The optical scanner 116 has a fill light 118 for adjusting the image quality of the code. The optical scanner 116 also has an aim light 120 to illuminate to the user the direction in which the optical scanner 116 is pointing. The optical scanner 116 further has a camera 122 for capturing codes. The optical scanner 116 further has a flashlight 124. The flashlight 124 illuminates the surroundings when the user is scanning in the dark. The user can turn on the flashlight 124 by pressing and holding the scan button 104.

Figure 1C:
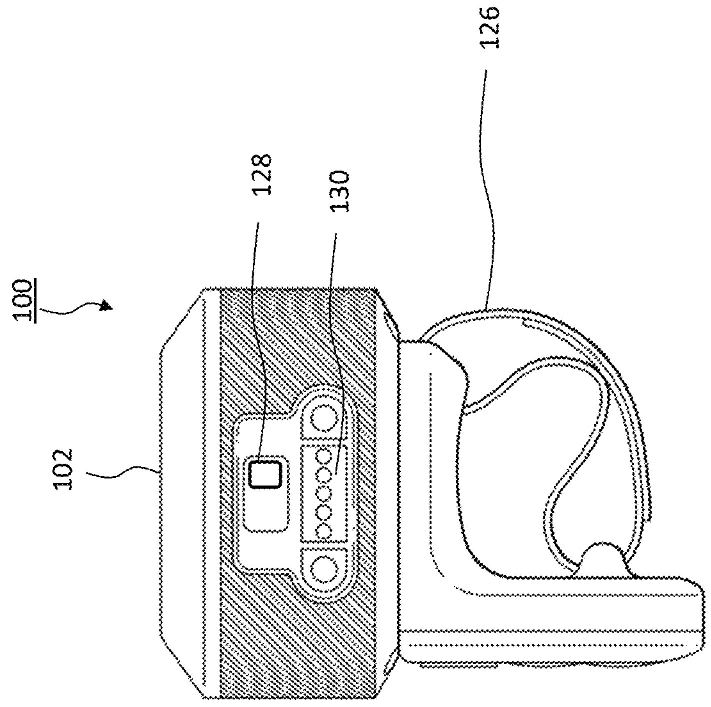

FIG. 1C is a rear view of the scanner device 100. The sliding lock 128 is a slider knob operated to remove a battery of the scanner device 100. The charging connector 130 is a terminal for charging the battery of the scanner device 100.

Figure 1D:
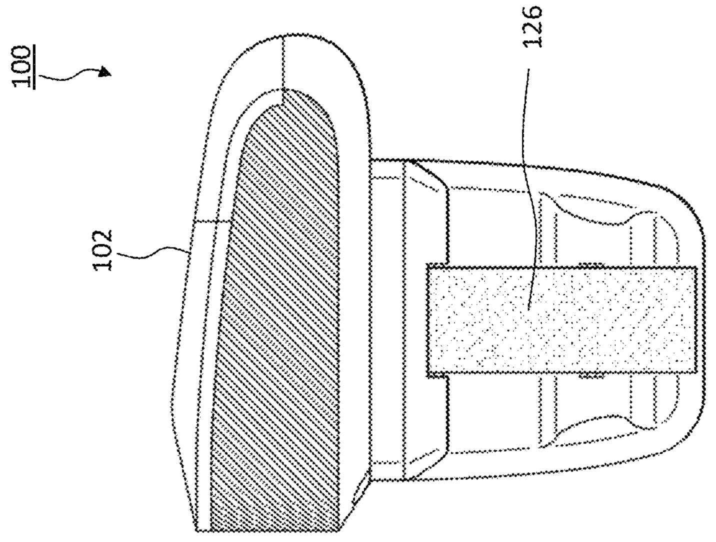
Figure 1E:
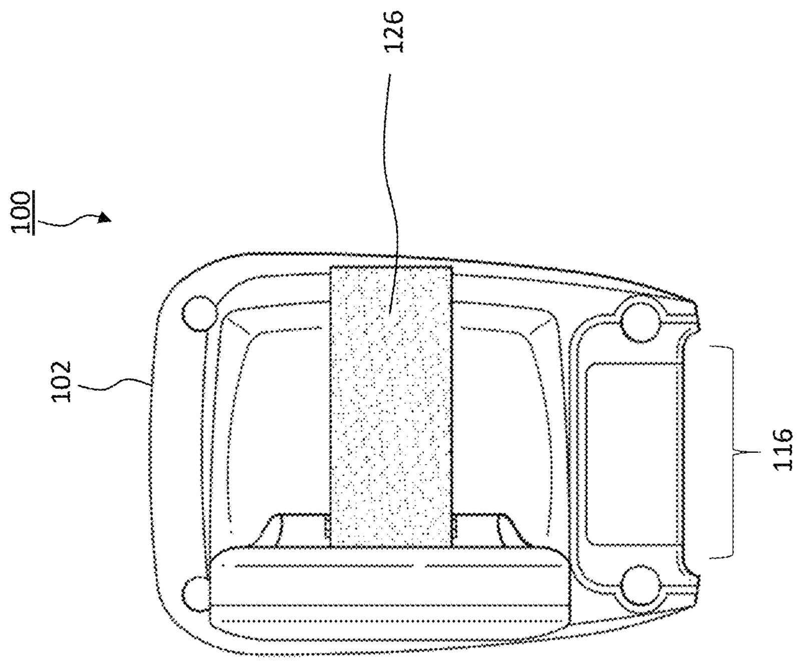

FIG. 1D is a right side view of scanner device 100. FIG. 1E is a bottom view of the scanner device 100. As shown in FIG. 1C through FIG. 1E, the belt loop 126 is used to secure the user's fingers to the scanner device 100. The belt loop 126 may be configured to loop around the user's index finger or the user's index and middle finger to grip the scanner device 100. By wrapping around the fingers, the belt loop 126 allows the user to maintain use of the user's hands while continuing to hold scanner 100. In other words, a housing of the scanner device 100 is configured to attach to the index finger of the user by the belt loop 126 encircling the index finger.

Figure 1F:
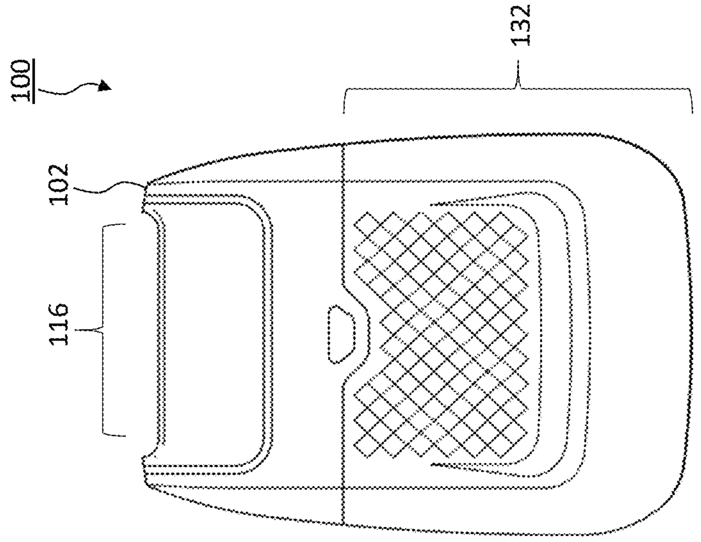

FIG. 1F is a top view of scanner device 100. The battery lid 132 is the lid of the battery case of the scanner device 100.

Figure 2:
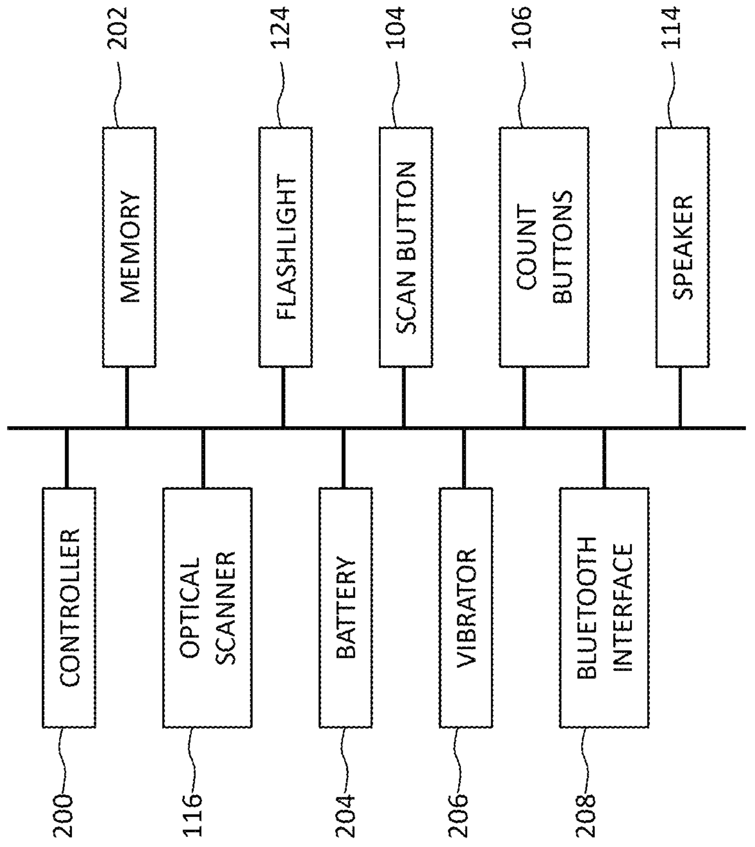
FIG. 2 is an architecture diagram illustrating the ring scanner according to the embodiment.

FIG. 2 is an architecture diagram illustrating the ring scanner. As shown in FIG. 2, the electronic components comprising the scanner device 100 are communicatively and electrically connected by a bus.

The controller 200 controls the electronic components that make up the scanner device 100. Unless otherwise mentioned in this disclosure, the controller 200 operates the scanner device 100 by controlling each component.

The memory 202 is a storage medium that temporarily or permanently stores information necessary for the operation of the scanner device 100. The information necessary for the operation of the scanning device 100 includes user preferences to configure operation of controller 200 (and hence scanner device 100) and the count buttons 106.

The battery 204 provides power to the components of the scanner device 100. The battery 204 of the scanner device 100 is removable.

The vibrator 206 vibrates in response to a user operation or the state of the scanner device 100. The vibrator 206 may vibrate in different patterns when the count buttons 106 is pressed, depending on which count button is pressed. In this disclosure, speaker 114 and vibrator 206 are examples of feedback devices. The feedback device may give different feedback to the user depending on which count button is pressed.

The Bluetooth interface 208 communicatively connects the scanner device 100 to the terminal device. The scanner device 100 may have other preferred or wireless interfaces for connecting to the terminal device. The scanner device 100 may have other wired or wireless interfaces for connecting to the terminal device.

System Architecture

Figure 3:
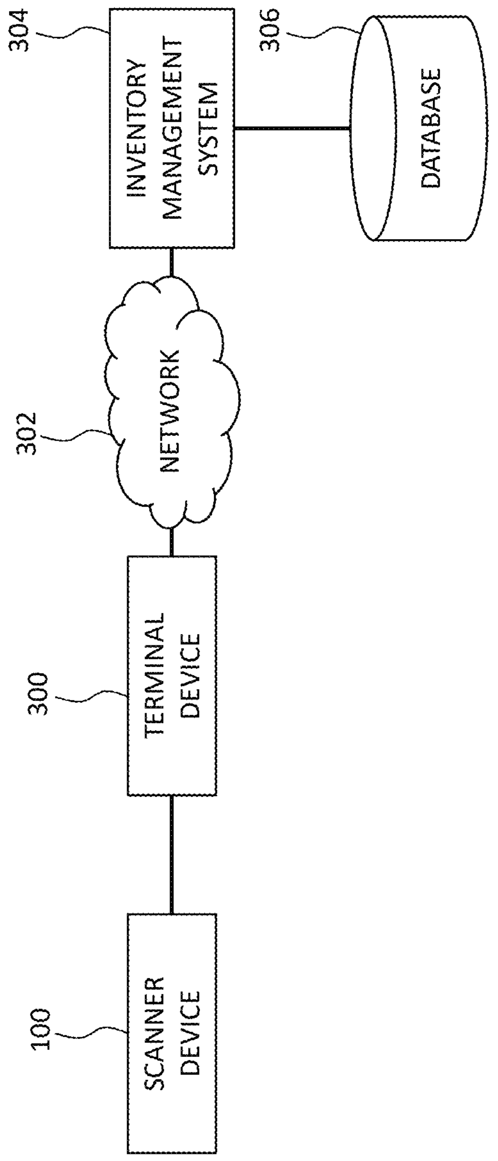
FIG. 3 is a diagram illustrating a system architecture according to the embodiment.

FIG. 3 is a diagram illustrating a system architecture according to the embodiment.

The scanner device 100 communicates with a terminal device. An example of terminal device 300 is a portable terminal with an operating system such as Android. The user uses the terminal device by, for example, fixing it to his/her arm. Wired or wireless communication paths other than Bluetooth may be used for communication between the scanner device 100 and the terminal device 300.

Terminal device 300 may represent a general purpose computing device. The terminal device 300 has a processor, memory, and a touch panel display. Terminal device 300 also has a communication interface for communicating with external devices via network 302.

An application is installed on the terminal device 300. The user references information on the terminal device 300 and enters information into the terminal device 300 by using the application.

The communication between the scanner device 100 and the terminal device 300 includes a variety of content. For example, the scanner device 100 sends the scanned code and symbology (the imaged code actually printed on the items) to the terminal device 300 to the terminal device. The communication details that take place when a user performs a scan are described later.

Communications between the scanner device 100 and the terminal device 300 include communications that take place other than when the user is scanning. An example of this communication is the communication that takes place when the scanner device 100 is configured using the terminal device 300. When configuring the settings of the scanner device 100, the user uses the configuration mode of the application installed on the terminal device 300.

Users can use the application to configure various settings. Examples of settings include setting parameters such as the value of the inventory count to be assigned to the count buttons 106, a time interval setting between scans, a decoding time setting, timing of data uploading (manual or automatic), a type of code ID character setting (symbol code ID, aim code ID, or code ID is off), and a picklist mode setting (enable or disable). Examples of settings further include settings related to the operation of the scanner device 100, such as turning on/off the vibrator 206, sleep settings, a volume or tone of the speaker 114, a setting of scanner function (on or off), a setting of illumination brightness, a setting of illumination function (on or off), and a setting of a connection between the terminal device 300 and the scanner device (Bluetooth SPP. Bluetooth BLE, USB SPP, USB HID, or Bluetooth HID), etc.

The terminal device 300 and inventory management system 304 are communicatively connected via network 302. An example of an inventory management system 304 is an application server with inventory management software installed. The inventory management system 304 uses information obtained from the terminal device 300 to update the database 306 using information obtained from terminal device 300.

The application of the terminal unit 300 assists the user in inventory by performing various processes in addition to those described above. An example of their processing can be listed as follows:

- The application provides an instruction code to connect the scanner device 100 with the terminal device 300. The user scans the instruction code by using the scanner device 100 to connect the scanner device 100 with the terminal device 300.

The application can show the scanner devices with asset tags that exist nearby the terminal device 300.

The application can connect the scanner device 106 which has a right asset tag without any password.

The application send the instructions to the scanner device 106 to configure an initial setup.

The application can configure the scanner device 106 by using a QR code. When the user scans the QR code shown in the application, a MAC ID address of the scanner device 106 is transmitted to the application. After the configuration, the scanner device 106 restarts and is automatically connected with the terminal device 300 and the application.

The applications can be customized using an SDK.

Operation of the Scanner Device and Terminal Device

Figure 4:
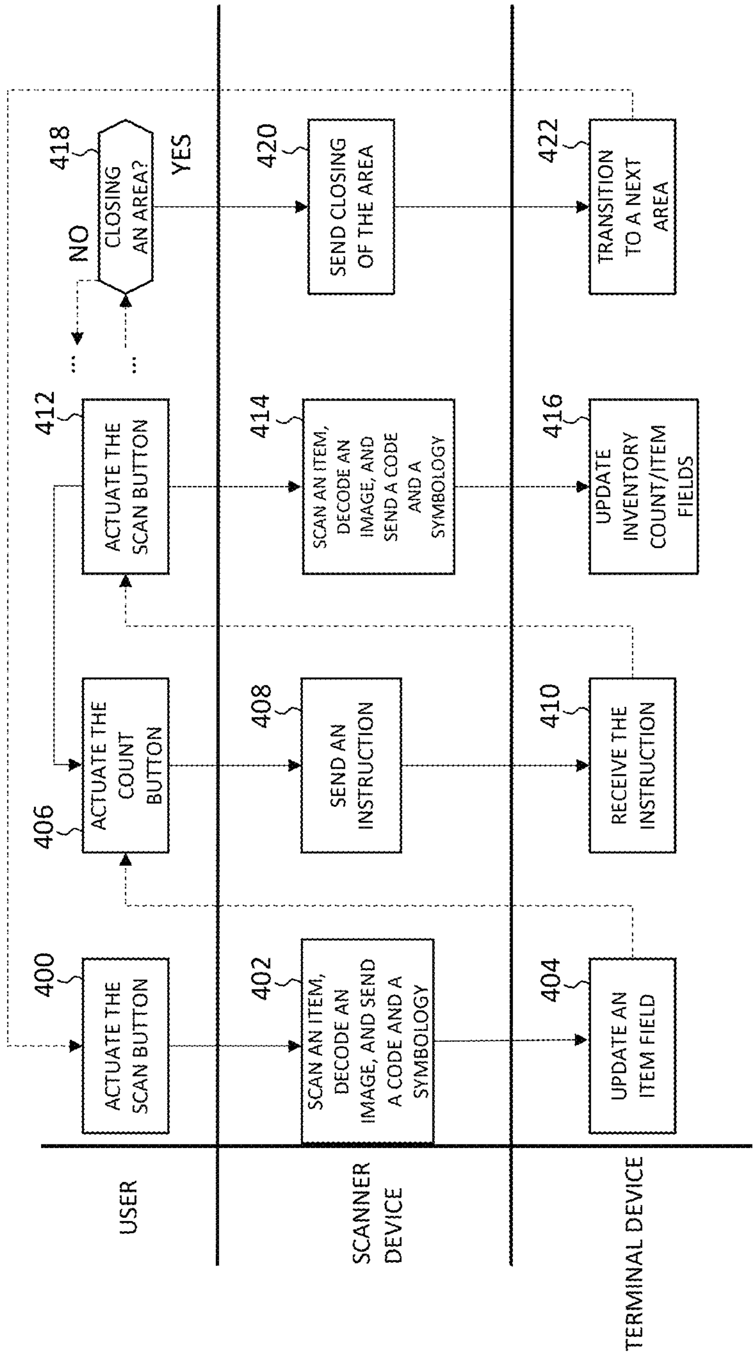
FIG. 4 is a flowchart illustrating an operation of a user, the scanner device, and a terminal device according to the embodiment.

FIG. 4 is a flowchart illustrating an operation of a user, the scanner device, and a terminal device according to the embodiment.

The operation described below is an operation in which a user in a warehouse sends the number of items present in the warehouse to the inventory management device 304 using the scanner device 100 and the terminal device 300 to the inventory management device 304. Before executing the operations described below, the user runs the application on terminal device 300. The user transitions the application from a configuration mode to a counting mode before starting the following operations. Unless otherwise noted, the operations described below are accomplished primarily by the user, the controller 200 of the scanner device 106, and the processor or the application of the terminal device 300.

In operation 400, the user actuates the scan button 104 with the thumb. The user uses the aim light 120 to point the optical scanner 116 at the code of the items and then actuates the scan button 104.

In operation 402, scanner device 100 drives optical scanner 116 to cause the optical scanner to scan the code. The controller 200 of the scanner device 100 causes the optical scanner 116 to scan with the camera 122 in response to the scan button 104 being pressed.

In addition, operation 402 decodes the codes scanned by the scanner device 100. The image scanned in operation 402 should contain an image of the code. The processor 200 of the scanner device 100 extracts the image of the code (symbology) from the scanned image and decodes the symbology to extract a code consisting of a string of characters. In operation 402, the scanner device 100 sends a code consisting of the extracted symbology and string to the terminal device 300.

In addition, in operation 402, the speaker 114 or vibrator 206 may provide feedback to the user. The scanner device 100 may change the way it provides feedback depending on the results of what is performed in operation 402. For example, the scanner device 100 may provide unusual feedback to inform the user if a code (symbology) is not present in the scanned image. For example, the scanner device 100 may provide unusual feedback to inform the user if the transmission to the terminal device 300 was not successful.

In operation 404, terminal device 300 updates a barcode field in the application. The application on terminal device 300 has fields for entering information about the scanned item's barcode, information of quantity of the item, and an area of scanning. In operation 404, the barcode field is updated. Terminal device 300 verifies conditions such as whether the product corresponding to the code is registered in database 306 based on the information received in operation 404. Verification of these conditions is done to avoid incorrect data from entering the database 306. During operation 404, terminal device 300 communicates with inventory management system 304 and communicates with it. During operation 404, terminal device 300 may display the results of the verification and information about the items on its own display.

In operation 406, the user actuates the count buttons 106 with his/her thumb. The user actuates the count buttons 106, each with a corresponding inventory count based on the number of items he/she has viewed. The details of this operation have already been described in the description of count buttons 106. Note that if the user actuates the scanner button 104 instead of the count buttons 106 the operation returns to operation 400.

In operation 408, the scanner device 100 sends instructions to the terminal device 300 containing the inventory count corresponding to the pressed count buttons 106.

In operation 410, terminal device 300 receives an instruction containing the inventory count sent from scanner device 100. If the user performs operation 410 again before proceeding to operation 412, terminal device 300 receives a new inventory count and adds the newly received inventory count to the previously received inventory count. The terminal device 300 enters the received inventory count into the quantity field of the application.

In operation 412, the user, who had previously pressed the count buttons 106, actuates the scan button 104 to scan a new item.

In operation 414, the scanner device 100 performs the same process as in operation 402 and perform the same process.

In operation 416, terminal device 300 saves the application's quantity field of the previously scanned item. In addition, in operation 416, terminal device 300 updates the application's quantity field of newly scanned item in the same manner as in operation 406.

These operations are repeated until the user has scanned the items present in a predetermined area of the warehouse.

In operation 418, the user may close the area when the user determines that the user scanned all the items in the predetermined area. The user can manipulate the scanner device 100 to close the area. An example of the manipulation includes the user simultaneously pressing the scan button 104 and one of the count buttons 106.

In operation 420, scanner device 100 transmits to terminal device 300 that the user has closed the area.

In operation 422, the terminal device 300 indicates on the display that it is closing the current area and transitioning to the next area and updates the area field of the application. The user may open the closed area by manipulating the application, if necessary.

The described operations are repeated until the user exits the application.

Key Functions of the Scanner Device

The structure and operation of the scanner device 100 have now been described. The following sections describe the functions that can be achieved by operating the scan button 104 and the count button 106 on the scanner device 100 in detail. In the following embodiments, it is assumed that colors are assigned to count buttons 108, 110, and 112, which comprise count buttons 106. In this case, red is assigned to count button 108, yellow to count button 110, and green to count button 112.

The first embodiment is that the function of the scan button 104 depends on which field is the focus of the terminal device 300's application. If the user shortly presses or holds down the scan button 104 when the field in focus is the area field, the scanner device 100 can scan the area. If the user shortly presses or holds down the scan button 104 when the field in focus is the barcode field, the scanner device 100 can scan the code. If the user shortly presses or holds down the scan button 104 when the field in focus is the quantity field, the scanner device 100 may enter the quantity of the item and move the focus to the barcode field. If the user shortly presses or holds down the scan button 104 when the field in focus is the quantity field, the scanner device 100 may scan the code of the next item. The table below summarizes the operations described above.

| Keys Used | Short/long | When on Field | Function |
|---|---|---|---|
| Trigger (Scan button 104) | Short/long | Area | Scanning area |
| | Short/long | Barcode | Scanning barcode |
| | Short/long | Quantity | Enter/pcs and move barcode field |
| | Short/long | Quantity | Scanning next barcode |

The second embodiment is that when the scan button 104 and one of the count buttons 106 (e.g., count button 112) are pressed shortly at the same time, an inventory count value is set on one of the count buttons 106. The table below summarizes the operations described above. In this example, only count button 112 is configurable, but it is possible to set values for count buttons 108 and 110.

| Keys Used | Short/long | When on Field | Function |
|---|---|---|---|
| Trigger + Red (Count button 108) | Short | Area only | Free |
| Trigger + Yellow (Count button 110) | Short | Area only | Free |
| Trigger + Green (Count button 112) | Short | Area only | Set value to green button |

The third embodiment is that the function executed when one of the count buttons 106 is pressed shortly is to input the value regarding the quantity of the item, as described above. At this time, the terminal device 300's application focuses on the quantity field. The behavior of a short press of one of the count buttons 106 when the focus is not on the quantity field may be user-configurable or may not perform any operation. The table below summarizes the operations described above. The count buttons 108, 110, and 112 are assigned the inventory counts 1, 2, and 3, respectively. The inventory counts for count button 112 is configurable.

| Keys Used | Short/long | When on Field | Function |
|---|---|---|---|
| Red | Short | Area | n/a |
| | Short | Barcode | n/a |
| | Short | Quantity | Value-1 |
| Yellow | Short | Area | n/a |
| | Short | Barcode | n/a |
| | Short | Quantity | Value-2 |
| Green | Short | Area | n/a |
| | Short | Barcode | n/a |
| | Short | Quantity | Value-3 Default/Configured |

The fourth embodiment is that when one of the count buttons 106 (e.g., count button 108) is pressed and held, the value of the field where the application is focusing on may be deleted. Another example of the fourth embodiment is that when one of the count buttons 106 (e.g., count button 110) is pressed and held, the area or the code where the application is focusing is validated, and if the application is focusing on the quantity field, it indicates moving to the next area. Another example of the fourth embodiment is that when one of the count buttons 106 (e.g., count button 112) is pressed and held, the flashlight 124 is turned on as a torchlight. The table below summarizes the operations described above.

| Keys Used | Short/long | When on Field | Function |
|---|---|---|---|
| Red | Long | Area | Erase area |
| | Long | Barcode | Erase barcode |
| | Long | Quantity | Erase quantity |
| Yellow | Long | Area | Torch |
| | Long | Barcode | Torch |
| | Long | Quantity | Torch |
| Green | Long | Area | Validate area in case area not in range |
| | Long | Barcode | Validate barcode in case not in PMF |
| | Long | Quantity | Moving to new area |

The fifth embodiment is that when two or more of the count buttons 106 are pressed shortly at the same time, the inventory counts assigned to each buttons may be added up and set the added value as the inventory count. For example, when the count button 108 (assigned value is 1) and the count button 110 (assigned value is 2) are pressed shortly together, the value of 3 may be sent as the inventory count. Another example of the fifth embodiment is that when two or more of the count buttons 106 are pressed shortly at the same time, the value of the inventory count assigned to none of the count buttons 106 is sent as the inventory count. For example, when the count button 110 (assigned value is 2) and the count button 112 (assigned value is 3) are pressed shortly together, the value of 6 may be sent as the inventory count. This value may also be configurable. The table below summarizes the operations described above.

| Keys Used | Short/long | When on Field | Function |
|---|---|---|---|
| R + Y | Short | Area | n/a |
| | Short | Barcode | n/a |
| | Short | Quantity | Value-3 |
| G + Y | Short | Area | n/a |
| | Short | Barcode | n/a |
| | Short | Quantity | value-6 even when configured |

The sixth embodiment is that when two or more of the count buttons 106 are pressed and held at the same time, any of the functions/operations described above or new functions may be performed. The table below summarizes the operations described above.

| Keys Used | Short/long | When on Field | Function |
|---|---|---|---|
| R + Y | Long | Area | Free |
| | Long | Barcode | Free |
| | Long | Quantity | Free |
| G + Y | Long | Area | Free |
| | Long | Barcode | Free |
| | Long | Quantity | Free |

The feedback device (e.g., speaker 114 or vibrator 206) may provide different feedback to the user depending on whether the button is pressed long or short. For example, if the button is pressed and held for a long time, it may sound two beeps or vibrate two times, and if the button is pressed for a short time, it may sound one beep or vibrate one time to provide feedback to the user. The feedback device may also beep at different frequencies depending on the button or combination of buttons pressed. The table below summarizes the operations described above.

| Keys Used | Short/long | when on Field | Sound/beeps |
|---|---|---|---|
| Trigger | Short/long | Area | 2950 HZ |
| | Short/long | Barcode | 2950 HZ |
| | Short/long | Quantity | no |
| | Short/long | Quantity | 2950 HZ |
| Trigger + Red | Short | Area only | n/a |
| Trigger + Yellow | Short | Area only | n/a |
| Trigger + Green | Short | Area only | n/a |
| Red | Short | Area | 2880 HZ |
| | Short | Barcode | 2880 HZ |
| | Short | Quantity | 2880 HZ |
| Green | Short | Area | 2670 HZ |
| | Short | Barcode | 2670 HZ |
| | Short | Quantity | 2670 HZ |
| Yellow | Short | Area | 2810 HZ |
| | Short | Barcode | 2810 HZ |
| | Short | Quantity | 2810 HZ |
| Red | Long | Area | TWO BEEPS |
| | Long | Barcode | TWO BEEPS |
| | Long | Quantity | TWO BEEPS |
| Green | Long | Area | TWO BEEPS |
| | Long | Barcode | TWO BEEPS |
| | Long | Quantity | TWO BEEPS |
| Yellow | Long | Area | TWO BEEPS |
| | Long | Barcode | TWO BEEPS |
| | Long | Quantity | TWO BEEPS |
| R + Y | Short | Area | 2740 HZ |
| | Short | Barcode | 2740 HZ |
| | Short | Quantity | 2740 HZ |
| G + Y | Short | Area | 2600 HZ |
| | Short | Barcode | 2600 HZ |
| | Short | Quantity | 2600 HZ |
| R + Y | Long | Area | TWO BEEPS |
| | Long | Barcode | TWO BEEPS |
| | Long | Quantity | TWO BEEPS |
| G + Y | Long | Area | TWO BEEPS |
| | Long | Barcode | TWO BEEPS |
| | Long | Quantity | TWO BEEPS |

Collaboration with Terminal Device User Interface

The functions of the count buttons 106 described above or functions described below can cooperate with a user interface on a display of the terminal device 300. As already explained, the scanner device 100 can be used with the terminal device 300. The terminal device 300 can be a smartphone-like device with a display and a touch screen or other input device. The display of terminal device 300 can display the user interface to indicate the item count status to the user.

Although the user of the scanner device 100 can work while looking at the display of the terminal device 300, it may be difficult to operate the terminal device 300 using the touch screen or keyboard of the terminal device 300 every time. In some aspects, to address this issue, the user interface of terminal device 300 can be manipulated by actuating the count buttons 106.

In some embodiments, the controller 200 can generate an instruction, in response to the actuation of at least one of the count buttons 106. The instruction can indicate a type(s) of the button(s) actuated (e.g., scan buttons 108, 110, 112 or a combination thereof.) The instruction can also indicate information relating to a period during which the button was pressed down. In some embodiments, the information relating to the period can be categorized as short press (less than 2 seconds), long press (greater than or equal to 2 seconds and less than 3 seconds), and extra-long press (greater than or equal to 3 seconds.) To provide feedback to the user, a different sound (e.g., different tone) may be played by the scanner device 100 depending on the length of the press.

The instruction can be transmitted via the Bluetooth interface 208 and received by a Bluetooth interface of the terminal device 300. The Bluetooth interface is an example of a communication interface and may be replaced by other wireless or wired communication interfaces as appropriate.

A controller of the terminal device 300 may execute operations based on the instruction. In this disclosure, controller is a generic term for components that control terminal device 300 and includes any types of processors and dedicated controllers. Results of the operations performed by the controller may be reflected in the user interface of the terminal device 300.

One of the operations can be the inventory count operation explained in operations 408 and 410. In further detail, when the instruction indicates that a single button of the count buttons 106 was short pressed, terminal device 300 increments the inventory count of the quantity field of the user interface by a number of item count corresponding to the pressed count buttons 106.

In some embodiments, the controller of the terminal device 300 may execute a specific operation when the instruction indicates that a single button of the count buttons 106 was long pressed or extra-long pressed, or two or more of the count buttons were pressed simultaneously as a combination. Some examples are described below.

Figure 5:
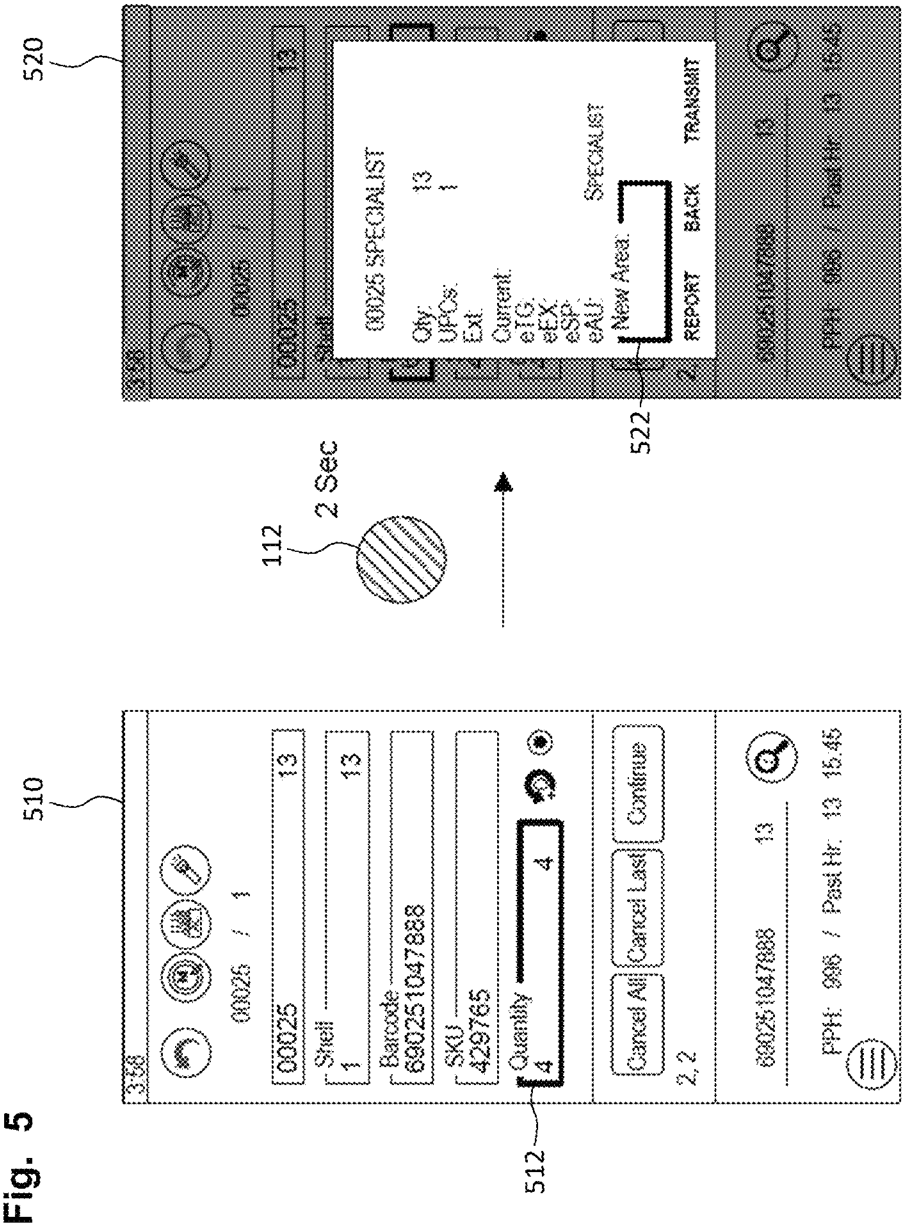
FIG. 5 is a screen transition diagram illustrating a closing operation of an area according to the embodiment.

FIG. 5 is a screen transition diagram illustrating a closing operation of an area according to the embodiment. The screen 510 shows the user interface of terminal device 300 before the actuation of the count buttons 106. As shown in the screen 510 a quantity field 512 is focused by an indicator. With the quantity field 512 in focus, the user can use terminal device 300 or count buttons 106 to enter the quantity of item. The number to the left of the quantity field 512 may indicate the value in the process of being entered, while the number to the right of the quantity field 512 may indicate the value that has been entered and confirmed.

As shown in FIG. 5, if one of the count buttons 106 (e.g., count button 112) is long pressed, while the quantity field is in focus, the controller of the terminal device 300 may execute an area closing operation. The area closing operation is an operation to change an area information. The area information indicates a physical area (e.g., of a retail store or warehouse) where an item scanned by the scanner device 200 is located when inventory of the item is being counted. The area information may be changed from a first area to a second area by the operation of the area closing operation.

When the area closing operation is executed, the user interface of the terminal device 300 may transition to a screen 520. As shown in the screen 520, the user interface prompts the user to enter information indicating the second area into new area field 522. The user may input the information of the second area via terminal device 300 or the scanner device 100. In this way, the user can transition the user interface of the terminal device 300 by operating the scanner device 100.

Figure 6:
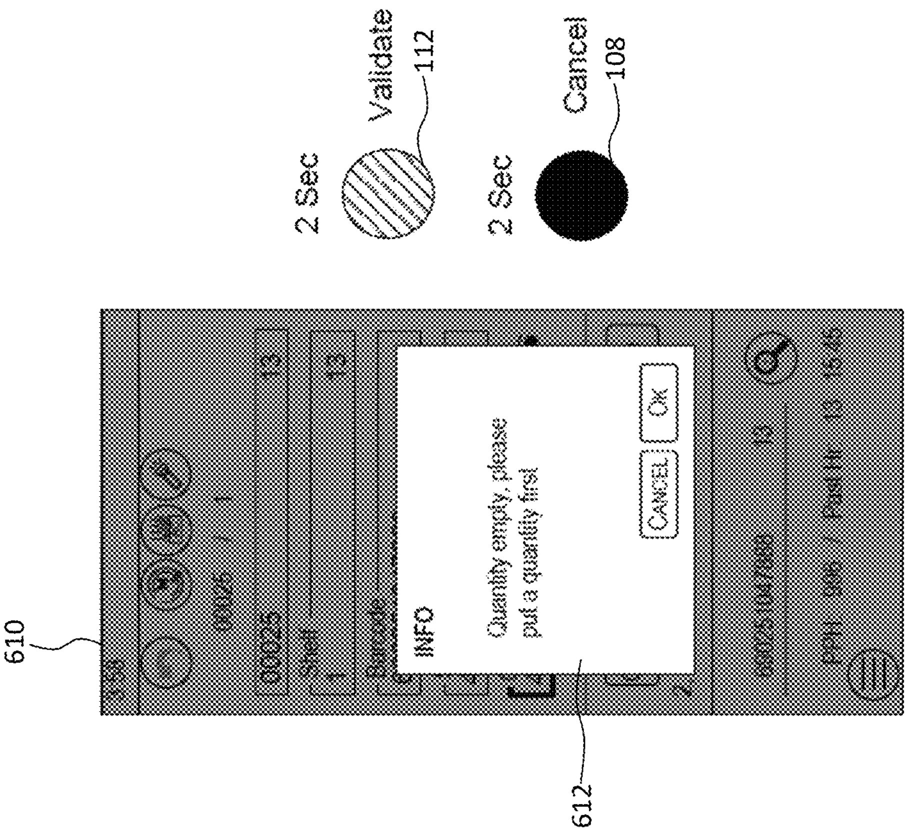
FIG. 6 is a prompt screen illustrating a validating/cancelling operation for a prompt message according to the embodiment.

FIG. 6 is a prompt screen illustrating a validating/cancelling operation for a prompt message according to the embodiment. A screen 610 displays a prompt message 612. The prompt message 612 asks the user to validate (OK) or cancel the message asking for the entry of a quantity. If the user long presses one of the count buttons 106 (e.g. count button 112) while the prompt message 612 is displayed, the screen 610 will transition to the next state, with determining the prompt message has been validated. If the user long presses another one of the count buttons 106 (e.g. count button 108) while the prompt message 612 is displayed, the screen 610 will transition to the next state, with determining the prompt message has been canceled. In this way, the user can validate or cancel the prompt message by operating the scanner device 200.

The circumstances under which the prompt message 612 is displayed are not limited to the situation shown on the screen 610. The prompt message 612 can appear in any situation that requires the user to confirm, for example, if the quantity entered is abnormally large or zero, or if the user scans a barcode that is not on the predetermined list.

Figure 7:
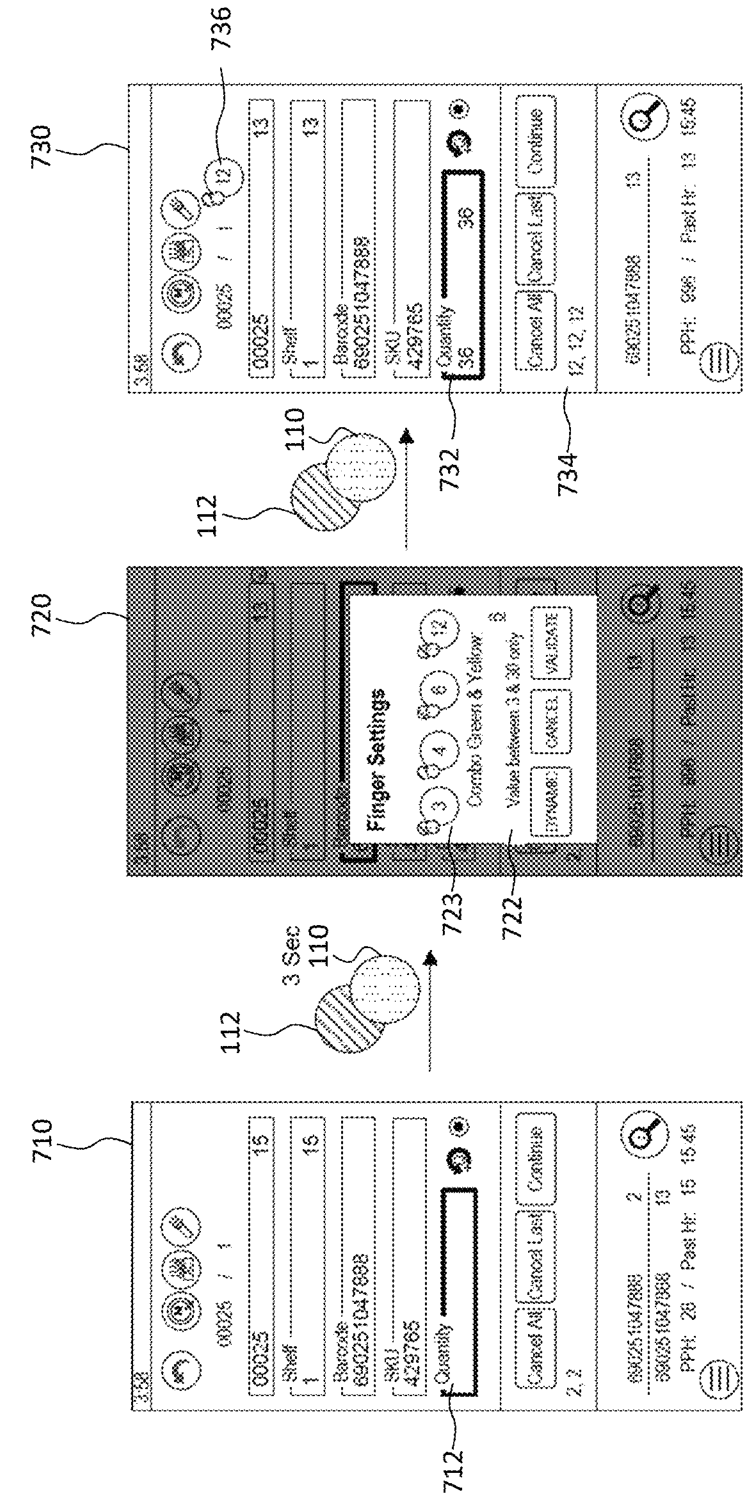
FIG. 7 is a screen transition diagram illustrating a custom operation according to the embodiment.

FIG. 7 is a screen transition diagram illustrating a custom operation according to the embodiment. A screen 710 shows the user interface of the terminal device 300 before the actuation of the count buttons 106. As shown in the screen 710 a quantity field 712 is focused by an indicator.

As shown in FIG. 7, if two or more of the count buttons 106 (e.g., count buttons 110 and 112) are extra-long pressed, while the quantity field 712 is in focus, the controller of the terminal device 300 may execute a custom quantity operation. The custom quantity operation may cause the user interface to display a custom quantity dialog 722 in a screen 720 for determining a number of item count to be associated to the combination of the count buttons 106. As shown in the custom quantity dialog 722, the user can input a custom number of item count to be associated to the combination of the count buttons (in FIG. 7, “6” is preset as a default value.) The range of numbers that can be set as the custom number may be limited to a predetermined value (e.g. 3-30).

In this embodiment, for example, the controller of the terminal device associates “12” to the combination of count buttons 110 and 112 based on the user input and the screen 720 transitions to a screen 730. The screen 730 shows a quantity filed 732, an input history field 734, and a combination icon 736.

The user may determine the number of item count to be associated to the combination of the count buttons 106 by using a touch screen of the terminal device 300. For example, as shown in the screen 720, quantity dialog 722 may display combination icons 723 with predetermined numbers (e.g., 3, 4, 6, and 12) for item counts. The combination icons 723 may be shown with images of the count buttons 106 (the count button 112 and the count button 110) to be assigned as shown in the screen 720. When the user touches one of the combination icons 723, the corresponding number of item count can be associated with the combination of count buttons 106. The predetermined numbers may be set to numbers other than 3, 4, 6, or 12. The user may also enter the number of item count using the keyboard or software keyboard on terminal device 300. Instead of entering a quantity, the user can also associate the quantity that was entered in the quantity field 712 immediately before with the combination of count buttons 106 as the number of item count by pressing the “DYNAMIC” button in the quantity dialog 722.

After the associating, if the user short press the count buttons 110 and 112 simultaneously, the controller of the terminal device 300 may increase the quantity of the quantity field 732 by the number of the item count associated to the combination. For example, if the user short presses the count button 112 and the count button 110 three times, 36 (12*3) is entered in the quantity field 732. In this way, the user can assign any item count number to any combination of count buttons 106 through interaction with the user interface.

Further, the screen 730 may display an increment each time the quantity of the quantity field is increased in the history field 734. In this way, the user can review the history of previous operations and increments of the quantity.

Further, the screen 730 may display the combination icon 736 indicating the number of item count and images imitating the buttons corresponding to the combination (the count button 112 and the count button 110.) For example, if the count button 112 is green and the count button 110 is yellow, then the two circles in the upper left corner of the combination icon 736 are also green and yellow. In this way, the user can visually see how many item counts are associated with any button combination.

Figure 8:
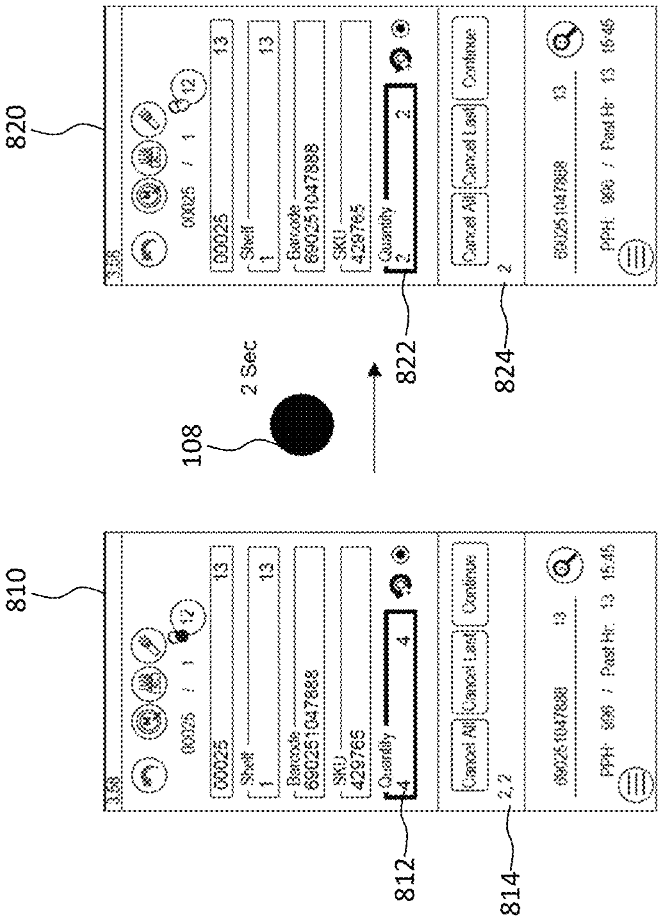
FIG. 8 is a screen transition diagram illustrating a clear value operation according to the embodiment.

FIG. 8 is a screen transition diagram illustrating a clear value operation according to the embodiment. The screen 810 shows the user interface of terminal device 300 before the actuation of the count buttons 106. As shown in the screen 810 a quantity field 812 is focused by an indicator. The quantity field 812 indicates that 4 is entered as the quantity of the item. In addition, the history field 814 indicates that the quantity of 2 has been entered twice so far as the item count. The quantity of the item may be input by, for example, short pressing one of the count buttons 106 as explained above.

As shown in FIG. 8, if one of the count buttons 106 (e.g., count button 108) is long pressed, while the quantity field is in focus, the controller of the terminal device 300 may execute an operation of the clear value and the screen 810 transitions to a screen 820. The clear value operation undo a last increment of the quantity of the quantity section. As shown in the screen 820, the quantity displayed in a quantity field 822 is reduced from 4 to 2 because the last increment of 2 in the quantity was undo. Similarly, the last increase of 2 is cleared from a history field 824. In this way, the user can undo a previous operation without directly operating the terminal device 300 and can visually confirm the result.

Figure 9:
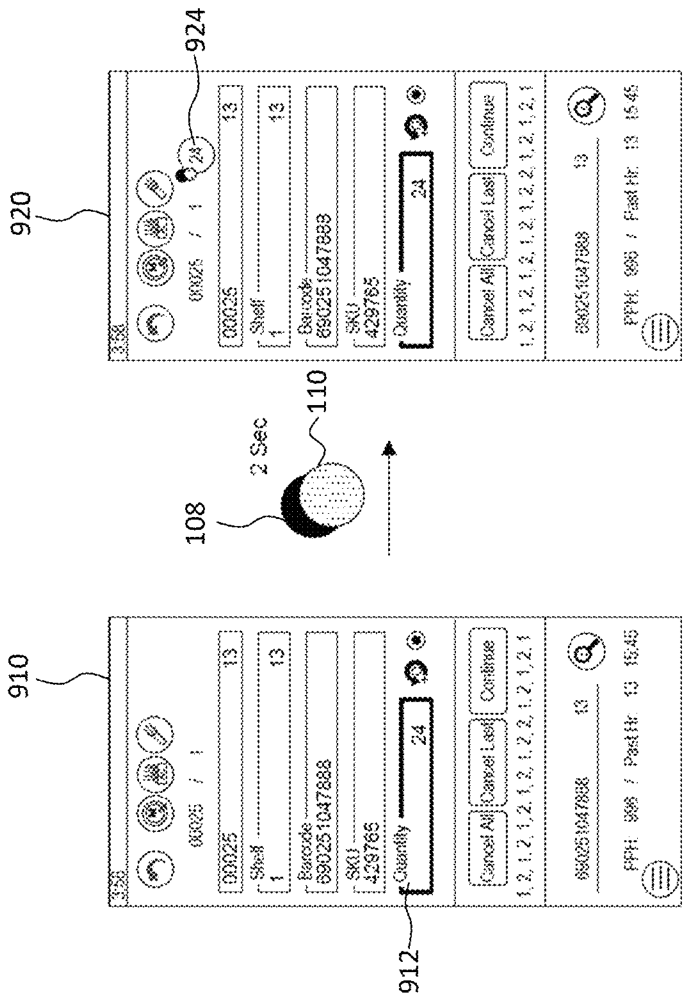
FIG. 9 is a screen transition diagram illustrating a repeat operation according to the embodiment.

FIG. 9 is a screen transition diagram illustrating a repeat operation according to the embodiment. A screen 910 shows the user interface of terminal device 300 before the actuation of the count buttons 106. As shown in the screen 910 a quantity field 912 is focused by an indicator. The quantity field 912 indicates that 24 is entered as the quantity of the item.

As shown in FIG. 9, if two or more of the count buttons 106 (e.g., count buttons 108 and 110) are long pressed, while the quantity field 912 is in focus, the controller of the terminal device 300 may cause the user interface to execute the repeat operation and the screen 910 transitions to a screen 920. The repeat operation is an operation to associate the quantity of the quantity field to a combination of the count buttons 108 and 110. As shown in the screen 920, a combination icon 924 indicates that 24 is associated with the combination of the count buttons 108 and 110 as the number of the item count. As already explained, for example, if the count button 108 is red and the count button 110 is yellow, then the two circles in the upper left corner of the combination icon 924 are also red and yellow. Thus, if the user short presses the count buttons 108 and 110, 24 is input as the number of item counts. In this way, the user can assign any item count number to any combination of count buttons 106 through interaction with the user interface. In some embodiments, the quantity associated to the count buttons 106 may be reset to a default value (e.g., 0) when the user instructs the closing operation to the terminal device 300.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and, thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A scanning system, comprising:
a scanner device comprising:
a housing configured to attach to an index finger of a user;
a plurality of buttons located on the housing and actuated by a thumb of the user;
a scanner that reads a barcode;
a first controller configured to, in response to actuation of at least one of the plurality of buttons, activate the scanner, and generate an instruction indicating which of the plurality of buttons was actuated; and
a first communication interface configured to transmit the instruction to a terminal device, and
the terminal device, separate from the scanner device but communicatively connected to the scanner device, comprising:
a display configured to display a user interface;
a second communication interface configured to receive the instruction from the scanner device; and
a second controller configured to determine a quantity of an item corresponding to the barcode based on which of the plurality of buttons was actuated, and increment a count for the item by the quantity.

2. The scanning system of claim 1, wherein
the second controller is further configured to determine the quantity of the item based on which single button out of the plurality of buttons was actuated, and increment the count for the item by the quantity.

3. The scanning system of claim 2, wherein
the user interface is configured to display the increment for the count for the item.

4. The scanning system of claim 3, wherein
the user interface is configured to display a history of the increment each time the quantity of a quantity field is increased.

5. The scanning system of claim 1, wherein
the second controller is further configured to change the quantity of the item corresponding to a single button out of the plurality of buttons in response to the instruction.

6. The scanning system of claim 1, wherein
the second controller is further configured to determine the quantity of the item based on a combination of two buttons out of the plurality of buttons actuated, and increment the count for the item by the quantity.

7. The scanning system of claim 6, wherein
the user interface is configured to display the increment for the count for the item.

8. The scanning system of claim 7, wherein
the user interface is configured to display a history of the increment each time the quantity of a quantity field is increased.

9. The scanning system of claim 6, wherein
the user interface is configured to display icons corresponding to the actuated buttons.

10. The scanning system of claim 6, wherein
the second controller is further configured to change the quantity of the item corresponding to the combination of the two buttons in response to the instruction.

11. A method of scanning an item by using a scanning system, wherein the scanning system comprising:
a scanner device comprising:
a housing configured to attach to an index finger of a user;
a plurality of buttons located on the housing and actuated by a thumb of the user;
a scanner that reads a barcode;
a first controller configured to, in response to actuation of at least one of the plurality of buttons, activate the scanner, and generate an instruction indicating which of the plurality of buttons was actuated; and
a first communication interface configured to transmit the instruction to a terminal device, and
the terminal device, separate from the scanner device but communicatively connected to the scanner device, comprising:
a display configured to display a user interface;
a second communication interface configured to receive the instruction from the scanner device; and
a second controller configured to determine a quantity of the item corresponding to the barcode based on which of the plurality of buttons was actuated, and increment a count for the item by the quantity.

12. The method of claim 11, wherein
the second controller is further configured to determine the quantity of the item based on which single button out of the plurality of buttons was actuated, and increment the count for the item by the quantity.

13. The method of claim 12, wherein
the user interface is configured to display the increment for the count for the item.

14. The method of claim 13, wherein the user interface is configured to display a history of the increment each time the quantity of a quantity field is increased.

15. The method of claim 11, wherein the second controller is further configured to change the quantity of the item corresponding to a single button out of the plurality of buttons in response to the instruction.

16. The method of claim 11, wherein the second controller is further configured to determine the quantity of the item based on a combination of two buttons out of the plurality of buttons actuated, and increment the count for the item by the quantity.

17. The method of claim 16, wherein the user interface is configured to display the increment for the count for the item.

18. The method of claim 17, wherein the user interface is configured to display a history of the increment each time the quantity of a quantity field is increased.

19. The method of claim 16, wherein the user interface is configured to display icons corresponding to the actuated buttons.

20. The method of claim 16, wherein the second controller is further configured to change the quantity of the item corresponding to the combination of the two buttons in response to the instruction, the first communication interface is further configured to transmit a second instruction to the terminal device, the user interface further displays a quantity field for indicating the quantity of the item scanned by the scanner, and the second controller is further configured to increase the quantity of the quantity field by a number of an item count associated to the combination of the two buttons of the plurality of buttons, when the second instruction indicates that the two buttons of the plurality of buttons were pressed simultaneously for a first period of time.

* * * * *